Jan. 12, 1960 S. T. CARTER 2,920,738
APPARATUS FOR SEPARATING LIKE ARTICLES AND DIVIDING THE
ARTICLES IN PREDETERMINED RELATIVE NUMBER
Filed Sept. 17, 1957 7 Sheets-Sheet 1
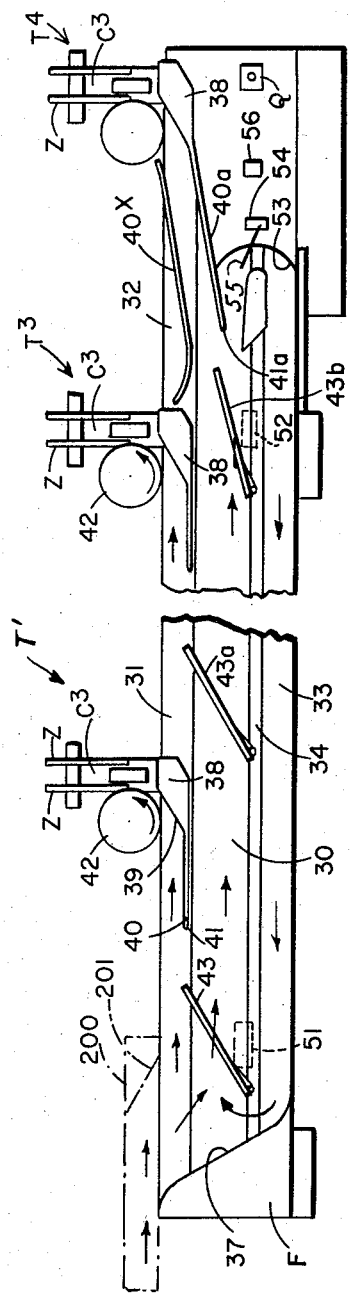
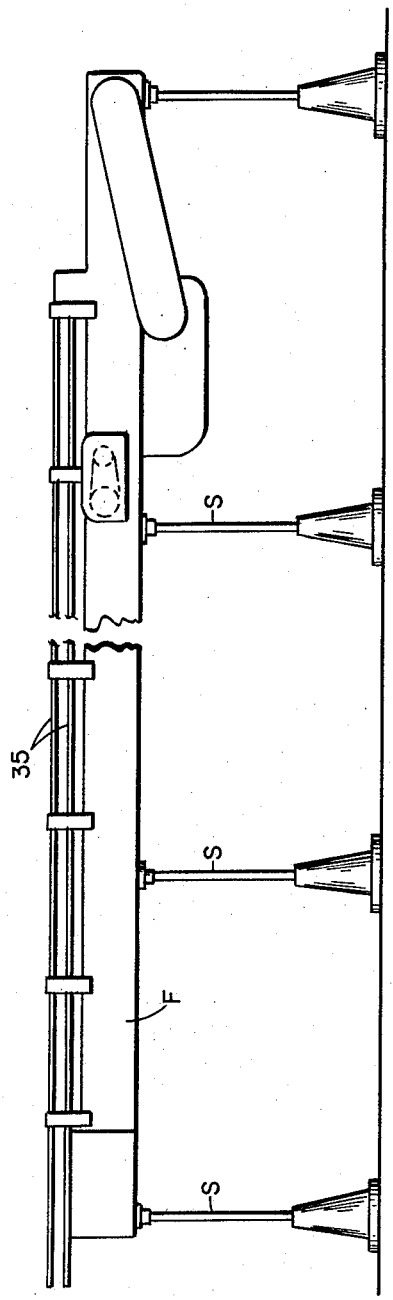
INVENTOR.
SIDNEY T. CARTER
BY
ATTORNEY.

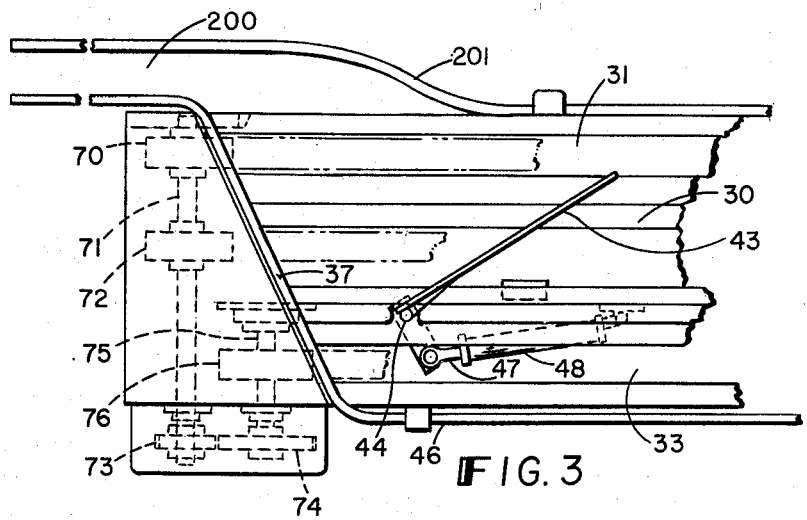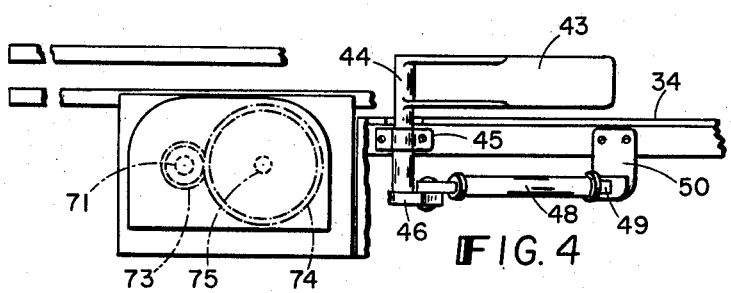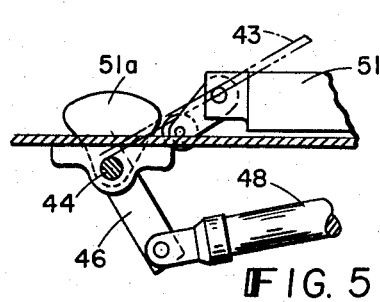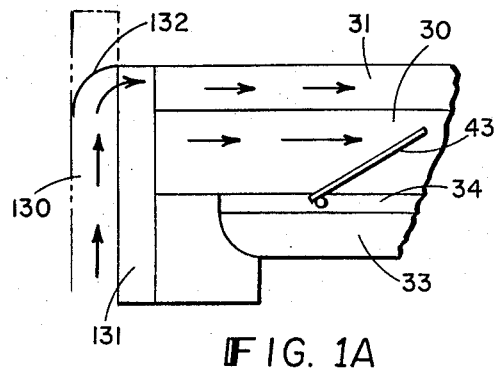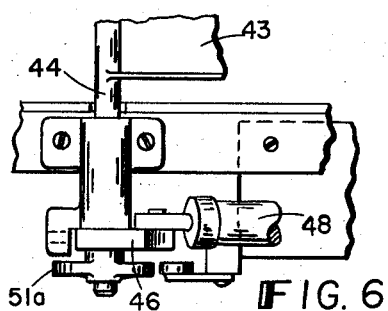

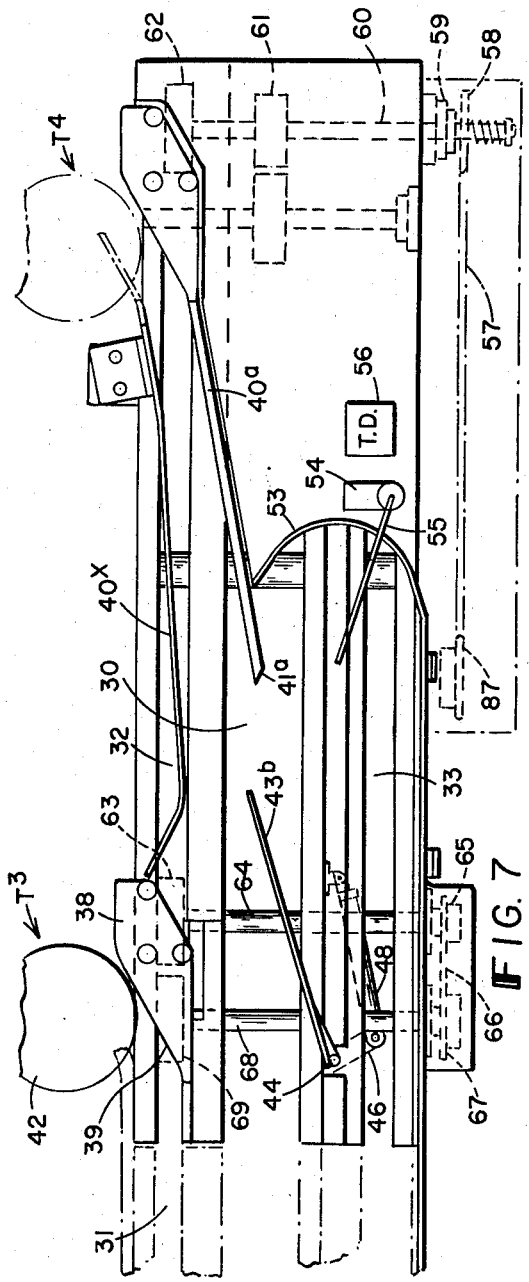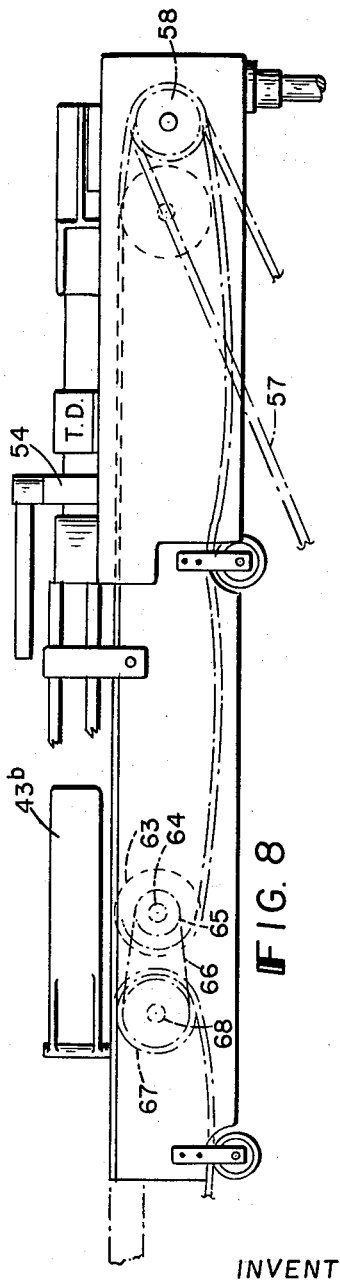
FIG. 7
FIG. 8
INVENTOR.
SIDNEY T. CARTER
BY
ATTORNEY.

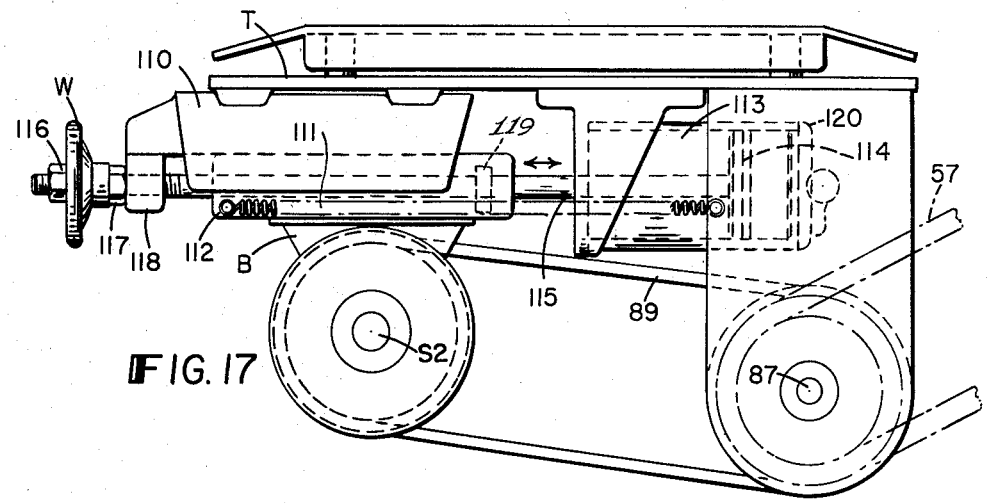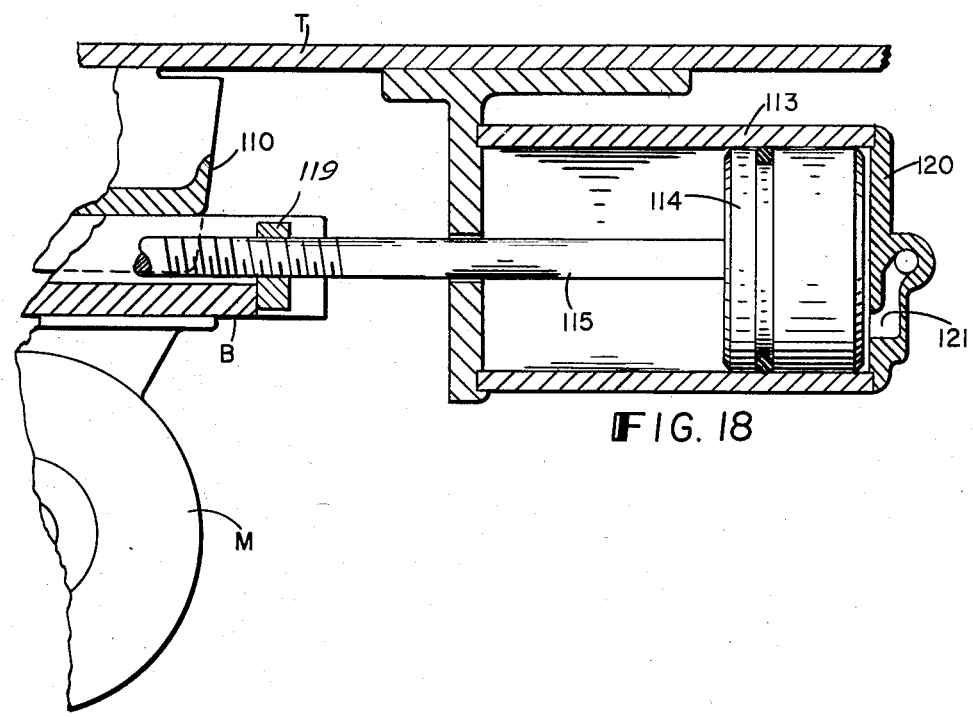

Jan. 12, 1960 S. T. CARTER 2,920,738
APPARATUS FOR SEPARATING LIKE ARTICLES AND DIVIDING THE
ARTICLES IN PREDETERMINED RELATIVE NUMBER
Filed Sept. 17, 1957 7 Sheets-Sheet 7

INVENTOR.
SIDNEY T. CARTER
BY
ATTORNEY.

United States Patent Office 2,920,738
Patented Jan. 12, 1960

2,920,738
APPARATUS FOR SEPARATING LIKE ARTICLES AND DIVIDING THE ARTICLES IN PREDETERMINED RELATIVE NUMBER

Sidney T. Carter, Shrewsbury, Mass., assignor to Geo. J. Meyer Manufacturing Co., Cudahy, Wis., a corporation of Wisconsin Application September 17, 1957, Serial No. 684,480

24 Claims. (Cl. 198—31)

This invention pertains to a method of and to apparatus for separating articles from a disorderly mass and, more especially, to apparatus operative to divide articles, for instance cans or bottles, received from a source of supply, for delivery in predetermined numbers to each of a plurality of outlets spaced along a predetermined path and through which articles may pass, for example to processing units, conveyors, receptacles, and so forth, and relates, more particularly, to a method of and conveyor apparatus for use in so dividing the articles and to novel speed control means comprised in said conveyor apparatus.

One object of the present invention is to provide article-dividing apparatus as a self-contained unit which may readily be conformed to almost any floor plan, for example, in a brewery in which such apparatus is useful. A further object is to provide article-dividing apparatus which may be entirely independent of the means for supplying the articles and of the means to which the articles are delivered and which includes its own driving motor means. A further object is to provide article-dividing apparatus having provision for moving articles along a predetermined path having spaced article-discharge outlets on one or the other side of said path as may be most convenient. A further object is to provide article-dividing apparatus wherein articles are moved along a predetermined path which has outlets spaced along said path and having means associated with each outlet for determining the direction of travel of articles as they recede from the article path.

A further object is to provide a novel method of dividing articles by the use of conveyor means for moving articles along a predetermined path and having outlets spaced apart along said path, wherein the speeds of parallel conveyor runs are so related that the action of the conveyor runs themselves suffices to supply the desired number of articles per minute to each of the outlets.

Another object of the invention is to provide article-dividing apparatus operative so to divide articles while they move along a predetermined path as to discharge an equal number of articles through each of a plurality of outlets spaced along said path or, alternatively, to discharge a different number of articles, respectively, through some, at least, of said outlets. A further object is to provide divider apparatus which is capable of receiving articles supplied, either in mass formation or file formation, and wherein the articles so supplied may approach the receiving end of the apparatus while moving either transversely or parallel to the direction of travel of the articles through the divider apparatus proper.

A further object is to provide article-dividing apparatus as a self-contained unit having outlets spaced along a predetermined path and having, associated with each respective outlet, an article disposing device, or receiver including conveyor means operative to carry away the articles discharged through the outlet to a desired point of delivery. A further object is to provide article-dividing apparatus wherein articles are moved along a predetermined path and discharged in a predetermined number through each, respectively, of a plurality of outlets spaced along said path, and having means for returning articles, not discharged through any of said outlets, to the receiving end of the apparatus. A further object is to provide article-dividing apparatus including conveyor means for moving articles along a predetermined path from which the articles may be diverted through one or another of spaced outlets and having means for controlling the speed of the conveyor means according to the rate at which the articles are received by the apparatus and the capacity of the apparatus to handle the articles. Thus, in accordance with the present invention, the speed of advance of the articles may be manually controlled by means provided for the purpose. However, automatic means is also provided for driving the conveyor means at either of two speeds, one, a low or idling speed when no articles are being supplied; and, the other, the desired normal operating speed while articles are being supplied in adequate quantity. In an alternative and preferred construction, provision is made for automatically driving the conveyor means at any one of three different speeds; the lowest of which is an idling speed when no articles are supplied; the second being the normal or working speed; and, the third being a high or reserve speed employed only when a substantial number of articles pass the last outlet without having been diverted from the conveyor path.

Other and further objects and advantages of the invention will be pointed out in the following more detailed description and by reference to the accompanying drawings wherein:

Fig. 1 is a fragmentary, diagrammatic plan view of article-dividing apparatus constituting one embodiment of the present invention, with certain parts broken away;

Fig. 1a is a fragmentary, diagrammatic plan view illustrating a slight modification of the apparatus shown in Fig. 1—in particular, the modified means for delivering articles to the dividing apparatus;

Fig. 2 is a diagrammatic front elevation of the apparatus of Fig. 1;

Fig. 3 is a fragmentary plan view, to larger scale than Fig. 1, showing the left-hand or receiving end of the apparatus;

Fig. 4 is a front elevation of the parts shown in Fig. 3;

Fig. 5 is a fragmentary plan view showing a slight modification of the article deflector which appears in Fig. 4;

Fig. 6 is a fragmentary elevation of the parts shown in Fig. 5;

Fig. 7 is a plan view, to the same scale as Fig. 3, showing the right-hand or terminal end of the apparatus;

Fig. 8 is a diagrammatic elevation of the parts shown in Fig. 7;

Fig. 17 is a fragmentary, diagrammatic elevation, similar to Fig. 10, but illustrating speed control means of a simpler form than that of Fig. 10;

Fig. 18 is a fragmentary, vertical section, to larger scale than Fig. 17, showing details of the control motor;

Figure 9:
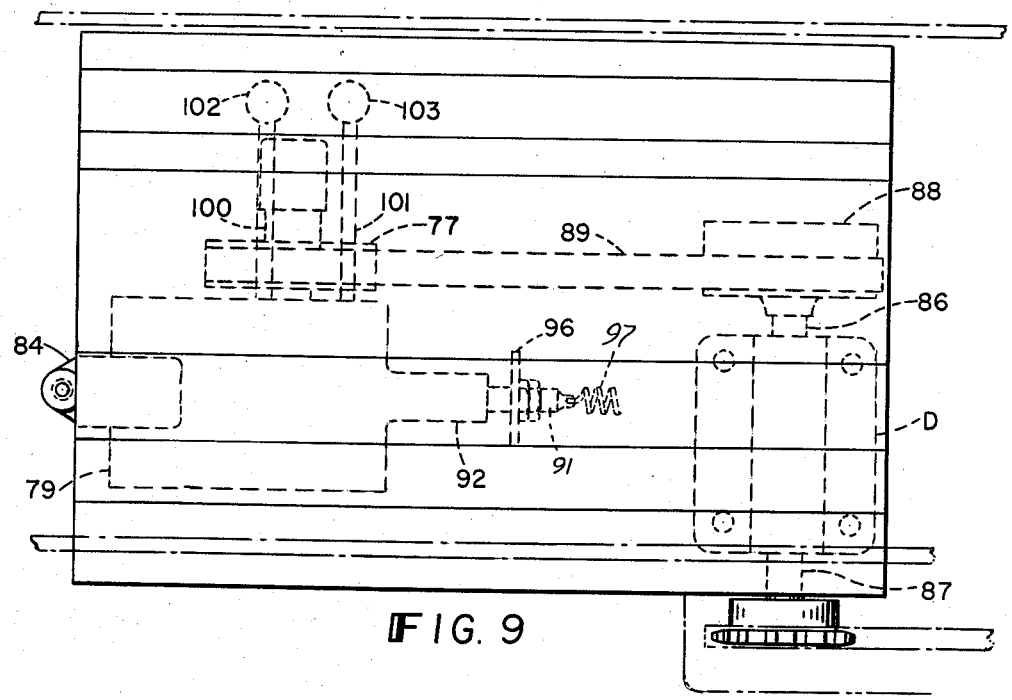
Fig. 9 is a fragmentary, diagrammatic plan view illustrating one form of variable speed drive for the conveyors of Figs. 1 to 7.
Figure 10:
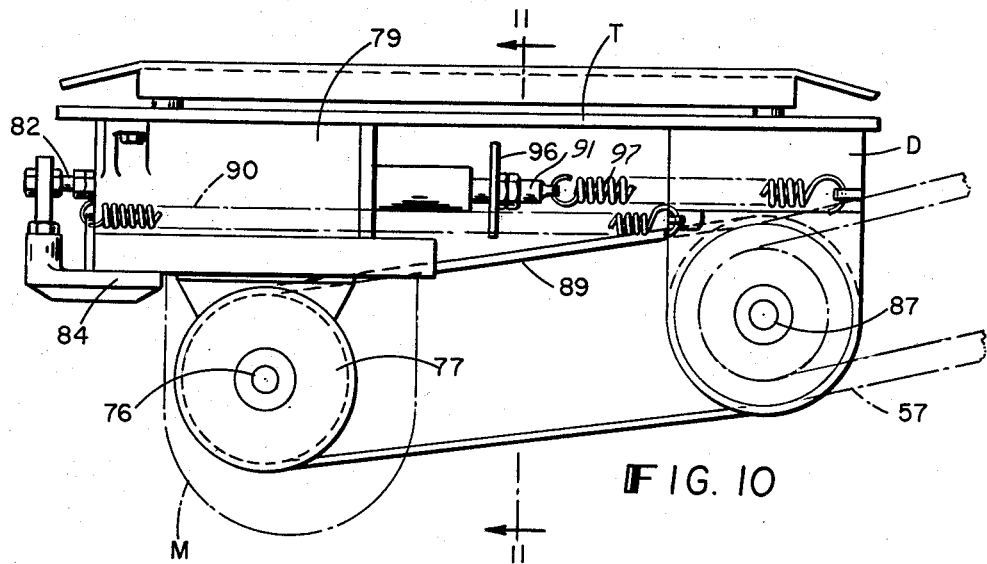
Fig. 10 is a fragmentary, diagrammatic elevation of the parts shown in Fig. 9.
Figure 11:
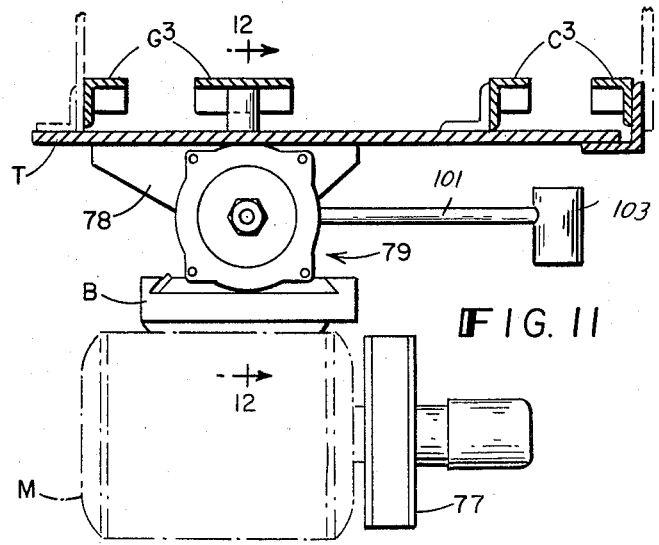
Fig. 11 is a vertical section on the line 11—11 of Fig. 10.
Figure 12:
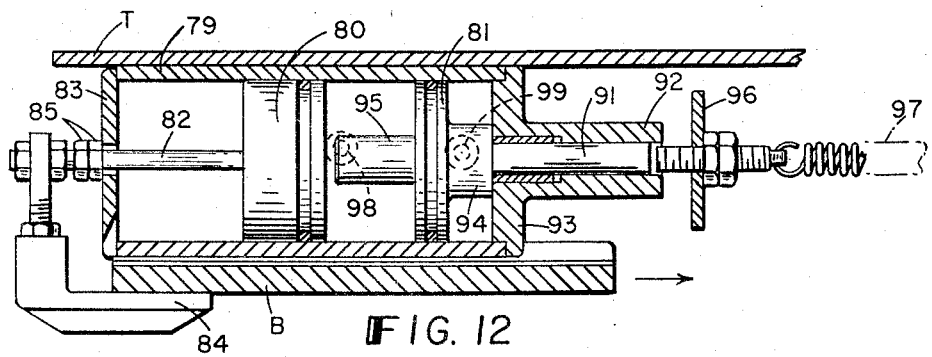
Fig. 12 is a vertical section on the line 12—12 of Fig. 11.

Referring to Figs. 1 and 2, the divider apparatus of the present invention is shown as comprising means for moving articles along a rectilinear path and including means for discharging articles from said path through outlets at one side of said path (three such outlets being illustrated merely by way of example). The articles from a supply are delivered to the dividing apparatus at its left-hand end, as shown in Fig. 1, and the outlets are shown as located at the left side of the article path (when looking along the path in the direction of the article travel). However, it is to be understood that the outlets may be located on the opposite side of the article path, if desired, with a corresponding reversal of the relative locations of the several conveyors.

More specifically, the divider apparatus comprises an elongate frame F (Figs. 1 and 2) supported at the desired height by standards S. Only three outlets are illustrated, but more or less may be provided. Normally spaced adjacent outlets are disposed, for example, a distance of four feet apart if the speed of the articles along the article path does not substantially exceed 300 feet per minute; if the speed of article-travel exceeds 300 feet per minute, a spacing of five feet six inches between adjacent outlets is recommended. However, a different spacing of the outlets may be adopted according to circumstances.

The apparatus of the present invention is a self-contained unit including the conveying means, together with the outlet assemblies, article disposing devices or receivers and the speed-varying drive means. Thus, the apparatus can be employed in any situation wherein the delivery of articles in predetermined relative numbers to a plurality of receivers is a desideratum. The frame F is provided with generally conventional means for supporting and guiding endless belt conveyors upon whose horizontal upper runs the articles rest as they progress along the article path. Desirably, the conveyors are of that type wherein the links of an endless chain carry smooth-surfaced metal plates which collectively form the article-supporting surface and which permit articles readily to be moved in a direction transversely of the length of the conveyor when desired. Since such conveyors are of well-known construction, no details of the conveyors are herein specifically illustrated; but, in Fig. 1, the upper runs of the several conveyors are designated by the numerals 30, 31, 32 and 33, respectively.

The conveyor 30 is the main conveyor and extends from one end to the other of the apparatus. This conveyor may, for example, be of the order of seven and one-half inches in width. At the left-hand margin of the conveyor 30 (as one looks along the conveyor in the direction of its travel), there is located the conveyor run 31 which extends from the receiving end of the apparatus, as viewed in Fig. 1, to the entrance to the next to the last outlet of the series, this outlet being the one designated as $T^3$ in Fig. 1. The conveyor 31 may, for example, be four inches in width. In line with this conveyor run 31 is a third conveyor 32 of the same width, which extends from the next to the last outlet $T^3$ to the last outlet $T^4$. Under some conditions, the conveyor run 32, as a separate unit may be dispensed with, the conveyor run 31 then extending for the full length of the apparatus.

At the right-hand margin of the main conveyor 30, there is arranged a "dead" plate 34 whose upper surface is in the same plane as the surface of the conveyor 30. At the right-hand edge of the dead plate 34, there is located the fourth conveyor 33 which may be of the same width as the conveyors 31 and 32 but which moves in a direction opposite to the conveyors 30, 31 and 32. Suitable guard rails 35, shown in Fig. 2 but not in Fig. 1, such as are customary in apparatus of this general type, may be arranged at the outer edges of the conveyors 31, 32 and 33 to prevent accidental escape of articles.

As illustrated, for example, in Fig. 1, each of the outlets $T^1$, $T^3$ and $T^4$ is arranged to discharge articles in a direction at right angles to the direction of motion of the conveyor 30. However, outlets designed to discharge articles at other than right angles to the conveyor 30 may be provided.

Figure 19:
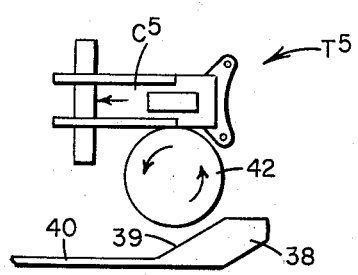
Fig. 19 is a diagrammatic plan view of an article diverter, applicable to any of the left-hand side outlets of the divider, and operative to discharge the articles in a direction parallel with but opposite to the conveyors.

Whereas in Fig. 1, the article disposing devices associated with the side outlets (which are all to the left-hand side of the conveyor) are provided with delivery conveyors $C^3$ which are at right angles to the conveyors 31 and 32, the arrangement illustrated by way of example in Fig. 19 is such that the articles are discharged at a left-hand outlet $T^5$ onto a delivery conveyor $C^5$ which is parallel to the conveyors 31 and 32, but which moves oppositely to the conveyor 31. In this arrangement, the power-driven turntable 42 carries the articles through an arc of 180°.

Figure 20:
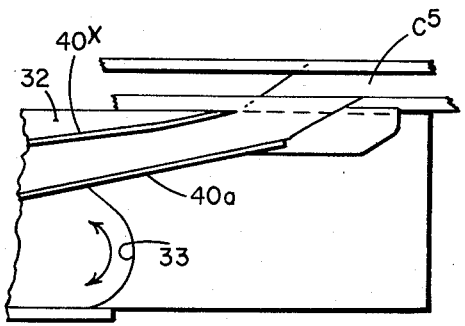
Fig. 20 is a view similar to Fig. 19, but showing a diverter for use at the end outlet and which is operative to discharge articles in a path parallel to and in the same direction as the conveyor.

In Fig. 20, there is shown an article disposing device which may be used at the end outlet $T^4$ of the conveyor. In this arrangement, the delivery conveyor $C^5$ is parallel and closely adjacent to and moves in the same direction and at a speed at least as great as that of the conveyor 32, the parts being so arranged that articles, following the path defined by the guides $40^a$ and $40^x$, move directly onto the conveyor $C^5$. In this article disposing device or receiver, no turntable is necessary.

Figure 21:
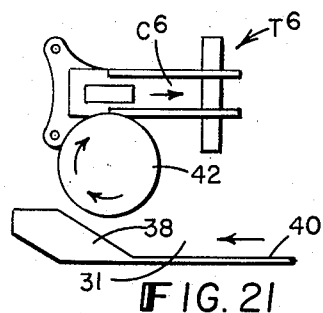
Fig. 21 is a view similar to Fig. 19, but showing diverting means applicable to a right-hand side outlet.

The arrangement of Fig. 21 is substantially identical with that of Fig. 19 except that this attachment is designed for application to apparatus having an outlet $T^6$ at the right-hand side of the conveyor. In this instance, the conveyor 31 is moving toward the left, and the conveyor $C^6$ is parallel to the conveyor 31 and moves to the right. The turntable 42 receives the articles from the conveyor 31 and moves them through an arc of 180° onto the conveyor $C^6$.

The article disposing devices shown in Figs. 19, 20 and 21 are merely by way of illustrative examples of standard attachments such as might be kept in stock by the machine manufacturer and supplied to customers according to the particular needs of installation being made.

Articles may be supplied to the receiving end of the apparatus in various ways. In a preferred arrangement illustrated in Fig. 1, the supply conveyor 200 (shown as a single conveyor) is parallel to the conveyors 30 and 31 and is provided with a deflector 201 which directs articles onto the conveyor 31 without abrupt change in their general direction of travel.

In Fig. 1a, a different arrangement is shown in which the single supply conveyor 130 is at right angles to the conveyors 30 and 31. With this arrangement, a wide dead plate 131 is necessary between the conveyor 130 and the receiving ends of the conveyors 30 and 31. The deflector 132 is so arranged as to move articles through an angle of 90° or more in switching them from the conveyor 130 onto the conveyors 30 or 31.

For convenience in describing the conveyor or conveyor runs is or are located nearest the row of outlets, the receivers from which articles are delivered to the outlets, said conveyor run or runs are sometimes herein referred to as the "nearer" or "rear" conveyor or conveyor runs while the conveyor 30 which is next adjacent to said nearer or rear conveyor is sometimes herein referred to as the "more remote" or "main" conveyor.

In the arrangement shown in Fig. 1, each outlet assembly or article disposing device comprises a fixed diverter 38 having a surface 39 which extends diagonally across the conveyor 31 (or 32). Desirably, each diverter, excepting that which is located at the outlet T⁴ also comprises an elongate, transversely narrow fin 40 extending toward the receiving end of the apparatus and terminating in a bevelled edge 41 designed to prevent articles from bridging as they approach the diverter. The diverter 38 which forms an element of the last outlet T⁴ has a fin 40ª, similar to the fins of the other outlets, but in this instance, the fin 40ª extends diagonally across the junction of the conveyors 30 and 32 and terminates at 41ª at a point intermediate the edges of the conveyor 30. Associated with this fin 40ª of the last outlet, there is a guide member 40ˣ which extends generally parallel to the fin 40ª but which diverges from the latter toward its left-hand end, as viewed in Fig. 1, and is there bent outwardly toward the outer edge of the conveyor 32 to form a flaring entrance for the passage defined by the fin 40ª and the guide 40ˣ.

Each outlet assembly or receiver also comprises means for supporting and driving an endless conveyor C³ (shown in Fig. 1 as disposed at right angles to the conveyor 30) and having appropriate guard rails Z. The conveyor C³ may be of any desired length but the several conveyors C³ need not necessarily be of the same length, the length of each conveyor C³ being appropriate to the particular installation and in accordance with the distance from the main conveyor to which articles are to be delivered. Outlets, such as illustrated in Fig. 1 wherein the article is delivered at right angles to the conveyor 30, desirably have a power-driven rotary plate 42 to assure the transfer of articles from the conveyor 31 to the conveyor C³.

Deflector devices 43, 43ª, 43ᵇ, etc. are associated with each respective outlet, each deflector being arranged in spaced relation to the next successive outlet so as to be contacted by articles moving along the article path before the articles reach the next diverter 38. Each of these deflectors, for example the deflector 43 (Figs. 3 and 4), comprises a resilient, flexible plate, for example of thin, spring steel, which normally extends diagonally across the entire width of the conveyor 30 and which is disposed at such an elevation, above the upper surface of the conveyor 30, as to be contacted by any moving article resting on the conveyor 30. Each of the deflector elements 43 is fixed at one end to a vertical rotary shaft 44 which extends down through an opening in the dead plate 34 and which turns in bearings in a bracket 45 (Fig. 4) fixed at the underside of the dead plate. A crank arm 46 is secured to the lower end of the shaft 44 and to this crank arm, there is connected one end of a piston rod 47 connected to a piston (not shown) which slides in a cylinder 48 which is pivotally connected by a yoke 49 to a fixed bracket 50 disposed beneath the conveyor and attached to the frame of the apparatus. Within the cylinder 48, there is arranged a compression spring (not shown) which urges the piston in a direction such as to tend to hold the deflector 43 in the normal position shown in Figs. 1 and 3, for example. However, in response to excess pressure of articles against a deflector, the latter may swing in opposition to the spring sufficiently to permit articles to move off of conveyor 31 onto conveyor 30 and to continue along on the conveyor 30. In accordance with one embodiment of the present invention, a switch device 51 (Fig. 5) is associated with the first deflector 43 and is actuated by a cam 51ª on shaft 44. Another switch device 52 is associated with the deflector 43ᵇ which is the last one of the series (Fig. 1).

A fixed curved guide 53 (Fig. 1) is arranged to be contacted by any article which moves along on the conveyor 30 forwardly of the end 41ª of the fin 40ª. This guide serves to switch articles from the right-hand end portion of the conveyor 30 transversely across the dead plate 34 onto the return conveyor 33. The articles which are so switched to the return conveyor are carried by the latter toward the receiving end of the apparatus. When these articles contact a fixed guide 37 at the receiving end of the apparatus, they are switched back onto the conveyor 30.

A switch 54 (Figs. 1 and 7) is associated with the guide 53 and has an arm 55 (Fig. 7) which extends into the path of articles moving along the guide 53. This arm is so arranged as to be deflected by contact with articles so moving and, when so deflected, actuates the switch. However, so that the switch will not be effectively actuated unless articles in quick succession are moving along the guide 53, a time-delay device 56 of any customary type is included in the switch circuit, as hereinafter more fully explained.

The several conveyors are driven by an endless chain 57 (Figs. 7 and 8) which embraces a sprocket wheel 58 connected by a slip clutch 59 to a horizontal shaft 60 which extends across the entire width of the conveyor assembly at the right-hand end of the apparatus as viewed in Fig. 7. A conveyor-driving sprocket 61 is fixed to the shaft 60 and drives the conveyor 30. A second sprocket 62 on the shaft 60 drives the conveyor 32. The endless chain of conveyor 32 also embraces a sprocket 63 (Figs. 7 and 8) on one end of a shaft 64 which extends transversely across the conveyor assembly and has a sprocket 65 at its opposite end. An endless chain 66 embraces the sprocket 65 and also a sprocket 67 on a shaft 68, parallel to the shaft 64, and which has a sprocket 69 at its opposite end which is engaged by the endless chain of conveyor 31.

At the receiving end of the machine (Fig. 3), the endless chain of conveyor 31 embraces a sprocket 70 on a shaft 71 which extends transversely of the conveyor assembly and which carries an idler sprocket 72 for guiding the conveyor 30 and which has a gear 73 fixed to it which engages a gear 74 on a shaft 75, parallel to the shaft 71. A sprocket 76, fixed to the shaft 75, engages and drives the chain of conveyor 33. By this drive arrangement, the conveyor 33 is driven reversely to the conveyors 30, 31 and 32. The ratio of gears 73 and 74 is as 0.54 to 1; while the ratio of sprocket 67 to sprocket 65 is as 1.21 to 1.

In the apparatus here illustrated in Figs. 9–12, the drive motor M is arranged below the lower runs of the conveyors. It is suspended from the horizontal frame plate T (Figs. 10 and 11) which carries the guides G³ (Fig. 11) for the lower conveyor runs. In order to permit the variation in speed of the conveyors, which is an essential feature of the invention, the motor is mounted for horizontal sliding movement in a direction perpendicular to the axis of the motor shaft. On the motor shaft S² (Fig. 10), there is fixed a pulley 77 which constitutes one element of a variable speed drive of the so-called "Reeves" type. The motor M has a base B (Fig. 11) which is dove-tailed to a bracket 78 which is attached by bolts or otherwise to the plate T, the base B being slidable lengthwise of the conveyors. The bracket 78 houses a cylinder 79 (Figs. 10 and 12) within which are two pistons 80 and 81. The piston 80 is connected to one end of a piston rod 82 which extends out through an opening in the cylinder head 83, the opening exceeding in diameter the diameter of the rod. The outer end of the rod 83 is connected by a bracket 84 to the motor base B so that motion of the piston 80 causes corresponding motion of the motor. Nuts 85 on the rod 82 may be adjusted to limit motion of the piston 80 to the right, as viewed in Fig. 12.

A speed reducer D (Figs. 9 and 10) of conventional type having an input shaft 86 and an output shafts 87 is suspended below the plate T. A pulley 88, fixed to the input shaft, constitutes the other element of the Reeves drive. The pulleys 77 and 88 are embraced by an endless belt 89, the pulleys and belt being of the kind common in a Reeves drive and operating in response to tightening of the belt to reduce the speed of the shaft 86 and vice versa to increase the speed of the shaft 86 when the belt is slackened. An elongate tension spring 90 (Fig. 10) is attached at one end to the motor base and, at its opposite end, to a fixed anchorage and constantly tends to move the motor to the right, thereby to decrease he speed of the driven shaft.

The piston 81 (Fig. 12), in the cylinder 79, is attached to a rod 91 which slides in an axial bore in a rigid, tubular stem 92, integral with the cylinder head 93. The piston 81 has a hub 94 which acts as a stop to limit motion of the piston 81 toward the cylinder head 93. The piston rod 91 has an extension 95, projecting from the piston at the opposite side from the hub 94, which acts, at times, to determine the position of the piston 80. The outer end portion of the piston rod 91 is screw-threaded and provided with nuts which determine the position of a plate 96 mounted on the rod and which is of a diameter exceeding that of the bore in the stem 92. A tension spring 97 (Fig. 12) is attached to the end of the piston rod 91 and tends to move the piston 81 to the right.

Figure 22:
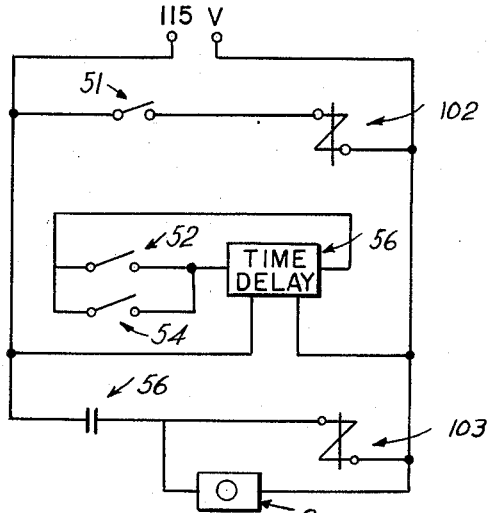
Fig. 22 is a wiring diagram showing the arrangement of switches employed in controlling the conveyor speed; and, Fig. 23 is a wiring diagram relating to a modified construction.

The cylinder 79 is provided with two parts 98 and 99 in its side wall, the port 98 being located between the pistons and the port 99 being located between the piston 81 and the head 93. Pipes 100 and 101 (Fig. 9) lead from the ports 98 and 99 to valves 102 and 103, respectively. These valves are solenoid valves and control the admission and release of pressure fluid to and from the cylinder 79. The valves 102 and 103 are three-way solenoid valves of a conventional type and are connected into an electrical circuit comprising the switches 52 and 54 as illustrated in Fig. 22. The valve 102 is supplied with compressed air, for example, at 20 pounds per square inch constant pressure and the valve 103 is supplied with compressed air, for example, at 40 pounds per square inch constant pressure.

The speed-varying arrangement, above described, provides for three different conveyor speeds as hereinafter more fully outlined; but, for certain conditions, it suffices to provide for two speeds only, and for this purpose, the simpler arrangement of Figs. 17 and 18 may be employed.

In these views, the same reference characters are employed to designate like parts, as in the above description. In the arrangement in Figs. 17 and 18, the motor base or carriage B is slidably supported by a bracket 110, bolted directly to the underside of plate T, and is urged toward the right by a spring 111 attached at one end to a lug 112 projecting from the motor base and at its other end to a fixed anchorage.

A cylinder 113 (Figs. 17 and 18) is mounted below the plate T. Within this cylinder is a piston 114 secured to one end of a piston rod 115 which extends not through an opening at the left-hand of the cylinder and freely through the bracket 110. This rod 115 is screw-threaded at its left-hand end portion (Fig. 17) and provided with a hand wheel W which is interposed between nuts 116 and 117. By means of this hand wheel, the rod 115 may be manually moved in an axial direction. The rod 115 passes freely through a guide opening in a lug 118 fixed to the bracket 110 and is free to move longitudinally through this opening. A nut 119, adjustably screw-threaded, to the rod 115, acts as a stop to limit motion of the rod 115 to the left. The cylinder 113 has a head 120 at its right-hand end. This head 120 has a port 121 leading to the space in the cylinder between the head and the piston. A pipe (not shown) leads from the port 121 to the solenoid valve 102.

Operation

This apparatus is designed smoothly to divide the articles solely by the difference of speeds of the several conveyors. Extended experiment has demonstrated that in the accomplishment of the desired objects, the normal speed of the conveyor 31 (which is nearest the outlets or receivers and to which the articles are first delivered at the receiving end of the apparatus) in inches per minute should equal or be not greater than 105% of the numerical value obtained by multiplying the number of articles which are to be discharged per minute through the first outlet by the transverse dimension, in inches, of each article.

In one desirable arrangement, as above suggested, the conveyor 30 is seven and one-half inches in width; the next adjacent conveyor, in both its main section 31 and in section 32 (if the latter be used) is four inches in width; and the reverse conveyor 33 is four inches in width. The conveyor 30 travels at a speed which is 1.21 times that of the conveyor 31. This higher speed allows articles, which are not discharged at the first outlet, to roll around those which are delayed at the entrance to the first outlet and to move over onto the conveyor 30 by which they are carried along past the first outlet. The next succeeding deflector 43ª then guides the articles back onto the conveyor 31 and (assuming that articles are being supplied in sufficient quantity) enough of these articles will be deflected back onto the conveyor 31 to supply the second outlet to capacity and so forth, until articles reach the last outlet.

As above noted, in accordance with one desirable arrangement, the conveyor which is next adjacent to the outlets comprises two independent sections arranged in tandem, the first section being indicated by numeral 31 and the second section by the numeral 32, the latter moving in the same direction as the first section but at a speed which exceeds that of the conveyor 30 in the ratio of 1.21 to 1. This additional speed of the last section 32 allows the last outlet to combine the remaining articles into a single line. The apparatus will divide articles accurately within from 10% to 15% between the several outlets, assuming that the normal conveyor speed has been properly adjusted. Accurate division within from 2% to 5% is easily maintained if provision is made for relatively adjusting the speeds of the outlet conveyors $C^3$. These outlet conveyors act as metering devices and their speeds determine the number of articles per minute delivered from each outlet. As a rule, the last outlet of a series will deliver articles within a range of approximately 5% of the number delivered by the preceding outlets. In many installations, it may not be necessary to provide for varying the speeds of the outlet conveyors $C^3$, but if each of the outlets must deliver the same number of articles per minute, the outlet conveyors $C^3$ should all be driven by a common drive having provision for varying the speed. Desirably, these outlet conveyors $C^3$ should be at least 5 feet in length in order to assure accurate division of the articles and provision should be made for taking the articles away from the delivery ends of the conveyor $C^3$ as fast as the conveyors supply them. Since the means for driving the outlet conveyors $C^3$ may be conventional, it is not here illustrated.

Under some conditions, articles will bypass the last outlet and these articles will be transferred back from the conveyor 30 onto the return conveyor 33 and, by this conveyor, returned to the receiving end of the conveyor 30. The speed of the return conveyor 33 is desirably 0.54 times that of the conveyor 30 to which the articles are first delivered. If the last outlet does not require that articles be combined into a single line but is wide open so as to take articles regardless of the order in which they approach, then it may not be necessary to make the conveyor 31 in two sections.

When the apparatus is arranged to provide for two speeds only, then the conveyors operate at low or idling speed when the articles are not being supplied at a rate sufficient to move the first deflector 43 from the position shown in Fig. 1. When articles are received in numbers sufficient to move the deflector 43, the switch 51 is actuated and the fluid pressure motor so moves the electric motor as to speed up the conveyors to normal. This speed will continue until articles cease entering the apparatus at a rate such as to move the deflector 43 from the position shown in Fig. 1.

When the apparatus is arranged to provide three speeds for the conveyors, this third speed is used only when articles are supplied so rapidly that they cannot normally be taken away by the several receivers operating collectively. When this occurs and articles engage deflector 43$^b$ with pressure such as to actuate switch 52 or move in rapid succession along the guide 53, after having passed the entrance to the last outlet so as to actuate the deflector 55 and thus operate the switch 54, the circuit through the time-delay 56 is closed thus, after a time interval, causing the fluid pressure motor to move the electric drive motor to a position such that the conveyors are driven at high speed, thus furnishing articles to the several outlets at abnormal speed. Under these conditions, signal Q is actuated to notify the operator to increase the speed of the outlet conveyor C$^3$.

Figures 13, 14, 15, 16:
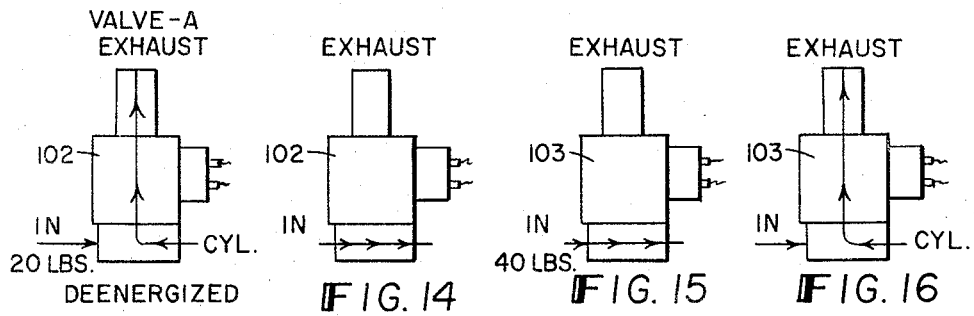
Figs. 13 to 16 are diagrammatic plan views showing a solenoid valve employed in the apparatus and respectively indicating the direction of the fluid flow through the valve under various conditions.

If insufficient articles are being supplied to swing the deflector 43 from the position, shown in Fig. 1, switch 51 will be closed and valve 102 will be set (Fig. 14) to deliver air through pipe 100 at 20 p.s.i. to the port 98 between pistons 80 and 81. Normally, the switches 52 and 54 are open and the solenoid valve 103 is de-energized (Fig. 15), thus admitting air at forty pounds per square inch through pipe 101 to port 99 so as to act on the right-hand side of the piston 81 so that the piston 81 is thereby moved as far to the left as is permitted by contact of plate 96 with the end of the stem member 92. Thus, while air at 20 p.s.i. is being admitted to the space between the pistons, as above described, the piston 80 will be as far to the left as it can go, thus moving the motor M to the left and tightening the belt 89, and so decreasing the speed of the shaft 86. The conveyor is now driven at low or idling speed, thus reducing wear and the amount of power required.

As soon as articles arrive in sufficient quantity to swing the deflector 43 from normal position, the switch 51 opens, thus shifting solenoid valve 102 (Fig. 13) so that air from the space between the pistons exhausts to the atmosphere. Spring 111 (assisted by the Reeves drive spring) now moves the piston 80 and the motor M to the right until the piston is stopped by contact with the part 95. Motion of the motor M to the right slackens the belt 89 and increases the speed of the conveyor to normal.

If during operation, articles approach the last deflector 43$^b$ in quantity sufficient to swing the latter far enough to close switch 52, or if articles move along the guide 53 so as to close switch 54, (then after a time interval) the solenoid valve 103 will be actuated (Fig. 16) to exhaust the fluid from between the piston 81 and the cylinder head 93. Piston 81 will then be moved by the spring 97 until stopped by contact of hub 94 with the cylinder head 93. Since, under such circumstances switch 51 is open and valve 102 is set so that the space between the pistons is open to the atmosphere, this movement of piston 81 permits piston 80 also to move to the right under the action of spring 111 and the Reeves drive spring until stopped by engagement of the nut 85 with the other head of the cylinder. Thus, motor M moves further to the right and belt 89 is slackened still more, so that the conveyor is driven at abnormally high or "reserve" speed. When valve 103 is open (Fig. 22), an electrical circuit is closed so as to energize a signal Q (Fig. 1), for example a lamp or bell, thus warning the operator to speed up the apparatus to which the articles are being delivered, to correspond to the abnormal high speed of the conveyor, in order to take care of the abnormal number of articles being received by the divider.

Figure 23:
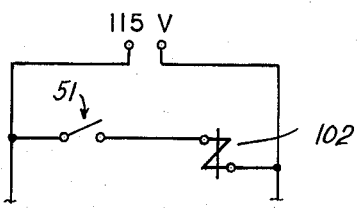

The simpler arrangement of Figs. 17, 18 and 23 provides for two speeds only, that is to say, normal speed and idling speed; and, for this purpose, only the switch 51 and the solenoid valve 102 are required.

While certain desirable embodiments of the invention have herein been illustrated and described by way of example, it is to be understood that the invention is broadly inclusive of all modifications which fall within the scope of the appended claims.

I claim:

1. An article-divider for separating articles from a disorderly mass, said apparatus comprising a frame which supports a plurality of parallel conveyors, means for driving said conveyors, and a row of article-receivers, said row extending along the outer edge of one of said conveyors, each of said receivers comprising guide means operative to constrain articles to move, one after another in tandem relation, along a predetermined path, and means operative to move articles along said path at a predetermined rate per unit of time, said parallel conveyors having article-supporting runs which are disposed in the same plane and which collectively define an undivided path for the articles, comprising fixed diverters operative to move articles transversely of that conveyor run which is next adjacent to the row of receivers, and movable deflectors which tend to move articles from said next adjacent conveyor onto said first-named conveyor, and means for driving that conveyor which is nearest to said row of receivers and which advances articles toward the first receiver of the row at a speed such as to supply articles to the first of said receivers to the full capacity of said receiver and means for driving said next adjacent conveyor which is next adjacent to said first conveyor at a speed of approximately 1.21 times that of the first conveyor.

2. Apparatus according to claim 1, wherein the means for driving the first of said conveyors is operative to impart thereto a speed at least equal to but which does not substantially exceed 1.05 times the speed in inches per minute at which articles may enter the first receiver, multiplied by the transverse dimension in inches of the articles being handled.

3. Apparatus according to claim 1 wherein the conveyor which is next to the row of receivers comprises sections arranged in tandem, the first section being arranged to deliver articles to all of the receivers except the last receiver and the second section being arranged to deliver articles to the last receiver only, the means for driving the first section of said conveyor being operative to impart thereto a normal speed such as to supply articles to the first receiver as fast as the latter can accept them and the means for driving the second section of said conveyor being operative to impart thereto a speed which is approximately 1.46 times that of the first section.

4. Apparatus according to claim 1, comprising means automatically operative to reduce the speed of the conveyors from normal to a predetermined low or idling speed whenever articles are received by the apparatus at a rate insufficient to keep the first of said receivers supplied to capacity.

5. Apparatus according to claim 1, comprising means automatically operative to increase the speed of the conveyors from normal to a high or reserve speed whenever articles, in rapid succession, pass the last of the receivers without having been diverted from the conveyor path.

6. Article dividing apparatus to which articles are delivered in a disorderly mass, said apparatus comprising a frame which supports a plurality of parallel conveyors and means for driving them, and a row of spaced article receivers extending along the outer edge of one of said conveyors, each receiver comprising means defining a path along which articles moving one after another in tandem relation can pass only at a predetermined rate per unit of time, each conveyor having an article supporting run of the kind which allows articles to be moved transversely of the direction of motion of the conveyor, said runs being in the same plane and defining an undivided article path, the apparatus comprising elements tending to cause articles to move transversely of said path toward that side of the path which is adjacent to said row of receivers, driving means operative to move the several conveyors at such relatively different velocities and in such relative directions as to supply each respective receiver to its full capacity, the minimum speed in inches per minute of that conveyor from which articles are delivered to the first receiver of the row being at least equal to, but not exceeding 1.05 times, the number of articles which the first receiver is able to accept per minute multiplied by the transverse dimension of the article in inches.

7. Article dividing apparatus to which articles are delivered in a disorderly mass, said apparatus comprising a frame which supports a plurality of parallel conveyors and means for driving them, and a row of spaced article receivers extending along the outer edge of one of said conveyors, each receiver comprising means defining a path along which articles moving one after another in tandem relation can pass only at a predetermined rate per unit of time, each conveyor having an article supporting run of the kind which allows articles to be moved transversely of the direction of motion of the conveyor, said runs being in the same plane and defining an undivided article path, the apparatus comprising elements tending to cause articles to move transversely of said path toward that side of the path which is adjacent to said row of receivers, driving means operative to move the several conveyors at such relatively different velocities and in such relative directions as to supply each respective receiver to its full capacity, the speed of that conveyor which is next adjacent to the conveyor which delivers articles to the first receiver being approximately 1.21 times that of the first conveyor, said conveyors moving in the same direction.

8. Article dividing apparatus to which articles are delivered in a disorderly mass, said apparatus comprising a frame which supports a plurality of parallel conveyors and means for driving them, and a row of spaced articles receivers extending along the outer edge of one of said conveyors, each receiver comprising means defining a path along which articles moving one after another in tandem relation can pass only at a predetermined rate per unit of time, each conveyor having an article supporting run of the kind which allows articles to be moved transversely of the direction of motion of the conveyor, said runs being in the same plane and defining an undivided article path, the apparatus comprising elements tending to cause articles to move transversely of said path toward that side of the path which is adjacent to said row of receivers, driving means operative to move the several conveyors at such relatively different velocities and in such relative directions as to supply each respective receiver to its full capacity, and wherein the conveyor which is the nearer to the row of receivers comprises two runs in tandem relation, one of said conveyor runs extending from the receiving end of the apparatus substantially to the next-to-the-last receiver and the other conveyor run extending from the next-to-the-last receiver to the last receiver, the conveyor driving means being operative to drive the main conveyor at a linear velocity which is approximately 1.21 times that of the conveyor run which supplies articles to the first receiver of the row, and to drive the second run of that conveyor, which is the nearest to said row of receivers, at a linear velocity which is approximately 1.21 times that of the main conveyor.

9. Article dividing apparatus to which articles are delivered in a disorderly mass, said apparatus comprising a frame which supports a plurality of parallel conveyors and means for driving them, and a row of spaced article receivers extending along the outer edge of one of said conveyors, each receiver comprising means defining a path along which articles moving one after another in tandem relation can pass only at a predetermined rate per unit of time, each conveyor having an article supporting run of the kind which allows articles to be moved transversely of the direction of motion of the conveyor, said runs being in the same plane and defining an undivided article path, the apparatus comprising elements tending to cause articles to move transversely of said path toward that side of the path which is adjacent to said row of receivers, driving means operative to move the several conveyors at such relatively different velocities and in such relative directions as to supply each respective receiver to its full capacity, and wherein the elements for causing articles to move transversely toward the row of receivers comprise fixed diverters each arranged to direct articles to a corresponding receiver from the conveyor which is next to said row of receivers and a movable deflector which tends to return such articles as have moved from said conveyor to the next adjacent conveyor, back to the first conveyor, and means including a switch operative, in response to the position of the first of said deflectors, to determine whether the conveyor is to run at a normal speed or at a reduced or idling speed.

10. Article dividing apparatus to which articles are delivered in a disorderly mass, said apparatus comprising a frame which supports a plurality of parallel conveyors and means for driving them, and a row of spaced article receivers extending along the outer edge of one of said conveyors, each receiver comprising means defining a path along which articles moving one after another in tandem relation can pass only at a predetermined rate per unit of time, each conveyor having an article supporting run of the kind which allows articles to be moved transversely of the direction of motion of the conveyor, said runs being in the same plane and defining an undivided article path, the apparatus comprising elements tending to cause articles to move transversely of said path toward that side of the path which is adjacent to said row of receivers, driving means operative to move the several conveyors at such relatively different velocities and in such relative directions as to supply each respective receiver to its full capacity, and including speed varying means for driving the conveyors at normal speed while articles are being received by the apparatus at a rate sufficient to supply the first of said receivers with all of the articles which it is able to accept, and at a lower or idling speed whenever articles received by the apparatus are insufficient to supply the first receiver to capacity.

11. Article dividing apparatus to which articles are delivered in a disorderly mass, said apparatus comprising a frame which supports a plurality of parallel conveyors and means for driving them, and a row of spaced article receivers extending along the outer edge of one of said conveyors, each receiver comprising means defining a path along which articles moving one after another in tandem relation can pass only at a predetermined rate per unit of time, each conveyor having an article supporting run of the kind which allows articles to be moved transversely of the direction of motion of the conveyor, said runs being in the same plane and defining an undivided article path, the apparatus comprising elements tending to cause articles to move transversely of said path toward that side of the path which is adjacent to said row of receivers, driving means operative to move the several conveyors at such relatively different velocities and in such relative directions as to supply each respective receiver to its full capacity, and including speed varying means for driving the conveyors at normal speed when articles are being received by the apparatus at a rate sufficient to supply the first of the receivers to full capacity and at a lower or idling speed when the articles received by the apparatus are insufficient to supply the first receiver to capacity, the speed-varying means including a Reeves-type drive wherein one of the pulleys is fixed to the shaft of an electrical motor and the motor is mounted for bodily movement to and from the complemental pulley of the Reeves drive, a fluid pressure motor for bodily moving the electric motor thereby to vary the speed of the conveyors, and means responsive to the position of the first of said movable deflectors to control the delivery and exhaust of pressure fluid to or from the fluid pressure motor.

12. Apparatus, according to claim 11, wherein the fluid pressure motor is so constructed and arranged as to be operative to move the electric motor to either of two predetermined positions corresponding to normal or idling speeds of the conveyor, and a switch, actuated by the first of said deflectors, controls the delivery and exhaust of pressure fluid to or from the fluid pressure motor.

13. Apparatus, according to claim 11, wherein the fluid pressure motor is so constructed and arranged as to be capable of moving the electric motor to any of three predetermined positions coresponding respectively to normal speed, idling speed and high speed of the conveyors, means responsive to the position of the first of said deflectors to control the delivery of pressure fluid to the fluid pressure motor thereby to determine whether conveyors shall run at normal or low speed, and means responsive to the movement of articles along that portion of the conveyors which is beyond the last of the receivers thereby to control the delivery of pressure fluid to the pressure motor in such a way as to determine whether the conveyors shall run at normal or high speed.

14. Apparatus, according to claim 11, wherein the fluid pressure motor comprises a cylinder having therein a single piston and an electrically operated valve responsive to the position of the first of said deflectors to admit pressure fluid to or exhaust it from said cylinder.

15. Apparatus, according to claim 11, wherein the fluid pressure motor comprises a cylinder having therein two independent pistons, one of said pistons being connected to the electric motor for moving the latter, and two electrically operated valves, one responsive to the position of the first of said deflectors and the second being responsive to the presence of articles on the part of the conveyor which is beyond the last receiver, to admit pressure fluid to the space between the pistons or the space between one of the pistons and the end of the cylinder, respectively.

16. An article divider for distributing articles received in a disorderly mass from a supply, said apparatus comprising a frame which supports conveyor means comprising two moving conveyors having horizontal parallel and closely adjacent article supporting runs arranged in the same plane and defining an undivided article path, means for driving the said conveyor, a row of spaced article disposing devices extending along the outer edge of one of said conveyor runs, the other of said runs being the main conveyor run, each article disposing device comprising means for guiding articles to move along a predetermined path and means for so moving articles along said path at a predetermined maximum linear velocity, article diverters associated with that conveyor which is the nearer to the row of article disposing devices, each diverter being associated with one of said article disposing devices respectively, and being operative to switch articles from said nearer conveyor into an outlet leading to the corresponding article disposing device, a deflector associated with each diverter and which is operative to crowd articles transversely of the more remote of said parallel conveyors and onto said nearer conveyor run, and means for driving the said nearer conveyor run at a speed less than that of the main conveyor run, but such as normally to supply articles to the first of said article disposing devices at least as fast as said device is able to accept them, and wherein the first of said row of article-disposing devices comprises means for moving articles along a predetermined path at a rate of K inches per minute, the conveyor driving means being operative to impart to the nearer of said conveyors a normal speed of approximately $1.05 \times K$ inches per minute.

17. An article divider for distributing articles received in a disorderly mass from a supply, said apparatus comprising a frame which supports conveyor means comprising two moving conveyors having horizontal parallel and closely adjacent article supporting runs arranged in the same plane and defining an undivided article path, means for driving the said conveyors, a row of spaced article disposing devices extending along the outer edge of one of said conveyor runs, the other of said runs being the main conveyor run, each article disposing device comprising means for guiding articles to move along a predetermined path and means for so moving articles along said path at a predetermined maximum linear velocity, article diverters associated with that conveyor which is the nearer to the row of article disposing devices, each diverter being associated with one of said article disposing devices respectively, and being operative to switch articles from said nearer conveyor into an outlet leading to the corresponding article disposing device, a deflector associated with each diverter and which is operative to crowd articles transversely of the more remote of said parallel conveyors and onto said nearer conveyor run, and means for driving the said nearer conveyor run at a speed less than that of the main conveyor run, but such as normally to supply articles to the first of said article disposing devices at least as fast as said device is able to accept them, and wherein the normal speed of the nearer of said conveyors is to the speed of the other of said conveyors as $$\frac{1}{1.21}$$

18. An article divider for distributing articles received in a disorderly mass from a supply, said apparatus comprising a frame which supports conveyor means comprising two moving conveyors having horizontal parallel and closely adjacent article supporting runs arranged in the same plane and defining an undivided article path, means for driving the said conveyors, a row of spaced article disposing devices extending along the outer edge of one of said conveyor runs, the other of said runs being the main conveyor run, each article disposing device comprising means for guiding articles to move along a predetermined path and means for so moving articles along said path at a predetermined maximum linear velocity, article diverters associated with that conveyor which is the near to the row of article disposing devices, each diverter being associated with one of said article disposing devices respectively, and being operative to switch articles from said nearer conveyor into an outlet leading to the corresponding article disposing device, a deflector associated with each diverter and which is operative to crowd articles transversely of the more remote of said parallel conveyors and onto said nearer conveyor run, and means for driving the said nearer conveyor run at a speed less than that of the main conveyor run, but such as normally to supply articles to the first of said article disposing devices at least as fast as said device is able to accept them, and comprising automatic means for changing the speed of the conveyor means from normal to low or idling speed whenever the rate of supply of articles to the apparatus is abnormally low.

19. An article divider for distributing articles received in a disorderly mass from a supply, said apparatus comprising a frame which supports conveyor means comprising two moving conveyors having horizontal parallel and closely adjacent article supporting runs arranged in the same plane and defining an undivided article path, means for driving the said conveyors, a row of spaced article disposing devices extending along the outer edge of one of said conveyor runs, the other of said runs being the main conveyor run, each article disposing device comprising means for guiding articles to move along a predetermined path and means for so moving articles along said path at a predetermined maximum linear velocity, article diverters associated with that conveyor which is the nearer to the row of article disposing devices, each diverter being associated with one of said article disposing devices respectively, and being operative to switch articles from said nearer conveyor into an outlet leading to the corresponding article disposing device, a deflector associated with each diverter and which is operative to crowd articles transversely of the more remote of said parallel conveyors and onto said nearer conveyor run, and means for driving the said nearer conveyor run at a speed less than that of the main conveyor run, but such as normally to supply articles to the first of said article disposing devices at least as fast as said device is able to accept them, and comprising automatic means for changing the speed of the conveyor means from normal to a high or reserve speed whenever the rate of supply of articles to the apparatus exceeds the rate at which articles can be accepted by said article-disposing devices collectively.

20. An article divider for distributing articles received in a disorderly mass from a supply, said apparatus comprising a frame which supports conveyor means comprising two moving conveyors having horizontal parallel and closely adjacent article supporting runs arranged in the same plane and defining an undivided article path, means for driving the said conveyors, a row of spaced article disposing devices extending along the outer edge of one of said conveyor runs, the other of said runs being the main conveyor run, each article disposing device comprising means for guiding articles to move along a predetermined path and means for so moving articles along said path at a predetermined maximum linear velocity, article diverters associated with that conveyor which is the nearer to the row of article disposing devices, each diverter being associated with one of said article disposing devices respectively, and being operative to switch articles from said nearer conveyor into an outlet leading to the corresponding article disposing device, a deflector associated with each diverter and which is operative to crowd articles transversely of the more remote of said parallel conveyors and onto said nearer conveyor run, means for driving the said nearer run at a speed less than that of the main conveyor run, but such as normally to supply articles to the first of said article disposing devices at least as fast as said device is able to accept them, the conveyor which is the nearer to the row of article-disposing devices comprising two independent aligned sections moving in the same direction, one of said sections extending from the next-to-the last of the outlets to the last outlet, and means for moving said last-named section of the nearer conveyor at a speed which is approximately 1.46 times that of the first section of said nearer conveyor.

21. Article-dividing apparatus designed to be installed as a unit for delivering articles, received from any source, whether in tandem relation or as a disorderly mass, in predetermined proportions, to each of a plurality of receivers, said apparatus comprising an elongate frame, a plurality of parallel conveyors mounted on the frame, a motor mounted on the frame, variable speed means operative to drive the several conveyors at a predetermined velocity ratio, a plurality of outlets adjacent to one of said conveyors, means associated with each outlet for delivering articles to one respectively of each of the receivers, and means associated with the first of said outlets for determining whether the conveyors shall run at normal speed or at an idling speed.

22. Apparatus, according to claim 21, having means responsive to the absence or presence respectively of articles on the conveyor, at a point beyond the last outlet of the series, for determining whether the conveyors shall run at normal speed or at an abnormally high speed.

23. An article divider for distributing articles received in a disorderly mass from a supply, said apparatus comprising a frame which supports conveyor means including two conveyors having horizontal, parallel and closely adjacent article-supporting runs arranged in the same plane and moving in the same direction and which collectively define an undivided article path, means for driving the respective conveyor runs, a row of spaced article-disposing devices extending parallel and closely adjacent to the outer edge of one of said conveyor runs, the other of said runs being the main conveyor run, each article disposing device comprising means for guiding articles to move along a predetermined delivery path and means operative to cause articles to move along said delivery path at a predetermined maximum linear velocity, each article disposing device, respectively, comprising an article diverter operative to switch articles from that conveyor run which is the nearer to said row of article-disposing devices into an outlet leading to the delivery path of the corresponding article disposing device, a deflector associated with each diverter and which is operative to crowd articles transversely of the main conveyor run and onto said nearer run, means for driving that conveyor run which is the nearer to said row of article disposing devices at a linear velocity substantially equal to that at which articles move along the delivery path of the first of said row of article disposing devices, means for driving the main conveyor run at a linear velocity exceeding that of said nearer run, and means operative to cause articles to move along the delivery path of the first of said row of article disposing devices at a linear velocity of approximately 1.05 ND inches per minute, where N equals the number of articles per minute which are to move along said path, and D equals the transverse dimension in inches of each article.

24. Apparatus for separating like articles from a disorderly mass, said apparatus comprising a supporting frame which carries a plurality of parallel conveyors capable of moving at relatively different speeds and having parallel article supporting runs disposed in the same plane, a row of spaced article receivers extending parallel to said conveyor runs, each of said receivers comprising means operative to cause articles to move along a predetermined delivery path, one after another, in tandem relation at a predetermined linear velocity, means for driving the conveyor run which supplies articles to the first receiver of said row at substantially the same linear velocity as that of articles moving along the delivery path of the first of said receivers, means for driving the main conveyor run at a speed exceeding that of the conveyor run which supplies articles to the first receiver of said row, and means whereby articles, not taken by the first article receiver of said row, are diverted onto the article supporting run of the main conveyor from that run which supplies articles to the first receiver of the row, means operative to restore such diverted articles to the conveyor run which supplies articles to the first receiver of the row after the diverted articles have passed said first receiver, and means operative to advance articles, in approaching the last article receiver of the row, at a linear velocity exceeding that of the article supporting run of the main conveyor.

References Cited in the file of this patent

UNITED STATES PATENTS

| 2,763,359 | Rose | Sept. 18, 1956 |
| 2,804,961 | Carter | Sept. 3, 1957 |